(12) United States Patent
Chivel

(10) Patent No.: US 12,030,253 B2
(45) Date of Patent: Jul. 9, 2024

(54) METHOD FOR PRODUCING THREE-DIMENSIONAL OBJECTS FROM POWDERS

(71) Applicant: Jury Aleksandrovich Chivel, Minsk (BY)

(72) Inventor: Jury Aleksandrovich Chivel, Minsk (BY)

( * ) Notice: Subject to any disclaimer, the term of this patent is extended or adjusted under 35 U.S.C. 154(b) by 0 days.

(21) Appl. No.: 15/038,036

(22) PCT Filed: Nov. 17, 2014

(86) PCT No.: PCT/IB2014/002526
§ 371 (c)(1),
(2) Date: Jul. 12, 2016

(87) PCT Pub. No.: WO2015/075539
PCT Pub. Date: May 28, 2015

(65) Prior Publication Data
US 2016/0339639 A1    Nov. 24, 2016

(30) Foreign Application Priority Data

Nov. 21, 2013    (RU) ................................ 2013152082

(51) Int. Cl.
*B29C 64/35* (2017.01)
*B23K 15/00* (2006.01)
(Continued)

(52) U.S. Cl.
CPC ............ *B29C 64/35* (2017.08); *B23K 15/002* (2013.01); *B23K 15/0026* (2013.01);
(Continued)

(58) Field of Classification Search
CPC ....... B29C 64/35; B29C 64/20; B29C 64/153; B29C 64/245; B29C 64/314;
(Continued)

(56) References Cited

U.S. PATENT DOCUMENTS 5,960,559 A * 10/1999 Brunnmair ................ F26B 1/00
                                                                110/216
2001/0045678 A1 * 11/2001 Kubo ...................... B29C 41/36
                                                                264/37.29
(Continued)

FOREIGN PATENT DOCUMENTS

EP            2156942 A1 *    2/2010    ............. B33Y 30/00

*Primary Examiner* — Jacob T Minskey
*Assistant Examiner* — Caroline Beha

(57) ABSTRACT

The invention is a method and device for producing three-dimensional objects, having a gradient of properties and multi-material objects, from powders. A method involves the selection of powders of various materials according to diameter, the successive application of layers of powder of a given thickness during the vertical displacement of a piston of a device build chamber with an object to be sintered, and the programmed selective sintering/melting of a given area in the plane of each layer. After sintering, piston is raised, unsintered powder is removed from a layer. The piston is then returned, and a layer of powder having a different diameter and being of a dissimilar material is applied and selectively sintered. When the object-sintering process is finished, the unsintered powder is removed from the build chamber, and the powders are separated according to diameter. The separated powders are returned to feed containers of device for re-use.

3 Claims, 3 Drawing Sheets

(51) Int. Cl.

| | |
|---|---|
| *B23K 26/064* | (2014.01) |
| *B23K 26/08* | (2014.01) |
| *B23K 26/082* | (2014.01) |
| *B23K 26/142* | (2014.01) |
| *B23K 26/144* | (2014.01) |
| *B23K 26/342* | (2014.01) |
| *B29C 64/153* | (2017.01) |
| *B29C 64/245* | (2017.01) |
| *B29C 64/314* | (2017.01) |
| *B29C 64/357* | (2017.01) |
| *B33Y 10/00* | (2015.01) |
| *B33Y 30/00* | (2015.01) |
| *B33Y 40/00* | (2020.01) |
| *B22F 10/28* | (2021.01) |
| *B22F 10/73* | (2021.01) |

(52) U.S. Cl.
CPC ........ *B23K 15/0086* (2013.01); *B23K 26/064* (2015.10); *B23K 26/082* (2015.10); *B23K 26/083* (2013.01); *B23K 26/0869* (2013.01); *B23K 26/142* (2015.10); *B23K 26/144* (2015.10); *B23K 26/342* (2015.10); *B29C 64/153* (2017.08); *B29C 64/245* (2017.08); *B29C 64/314* (2017.08); *B29C 64/357* (2017.08); *B33Y 10/00* (2014.12); *B33Y 30/00* (2014.12); *B33Y 40/00* (2014.12); *B22F 10/28* (2021.01); *B22F 10/73* (2021.01); *Y02P 10/20* (2015.11); *Y02P 10/25* (2015.11)

(58) Field of Classification Search
CPC .............. B29C 64/357; B23K 26/0869; B23K 26/064; B23K 26/082; B23K 26/142; B23K 26/144; B23K 26/342; B23K 15/002; B23K 15/0026; B23K 15/0086; B23K 26/083; B22F 3/1055; B22F 2003/1059; B33Y 40/00; B33Y 10/00; B33Y 30/00; Y02P 10/295; Y02P 10/24
See application file for complete search history.

(56) References Cited

U.S. PATENT DOCUMENTS

| | | | | |
|---|---|---|---|---|
| 2002/0145213 | A1* | 10/2002 | Liu | G03G 15/224 264/40.1 |
| 2006/0214335 | A1* | 9/2006 | Cox | B22F 10/28 425/375 |
| 2008/0241404 | A1* | 10/2008 | Allaman | B29C 64/165 427/333 |
| 2010/0192806 | A1* | 8/2010 | Heugel | B33Y 40/00 106/286.1 |
| 2012/0328672 | A1* | 12/2012 | Conrad | A61K 35/28 424/400 |
| 2014/0271328 | A1* | 9/2014 | Burris | B33Y 10/00 419/53 |
| 2015/0071809 | A1* | 3/2015 | Nordkvist | B22F 3/1055 419/23 |
| 2016/0193696 | A1* | 7/2016 | McFarland | B23K 26/342 219/76.12 |

\* cited by examiner

METHOD FOR PRODUCING THREE-DIMENSIONAL OBJECTS FROM POWDERS

CROSS REFERENCE TO RELATED APPLICATIONS

The present application is a National stage application from PCT application PCT/IB2014/002526 filed Nov. 17, 2014 claiming priority to Russian application RU2013152082 filed on Nov. 21, 2013.

FIELD OF THE INVENTION

The invention relates to the field of high-energy material processing and can be used in producing three-dimensional objects, having a gradient of properties and multi-material objects, from powders.

BACKGROUND OF INVENTION

A method is known for producing objects with gradient of properties (see Wang, Chunchau, Hu, Yiadong. Cu/Fe Powder Gradient Material Sintering by Laser Processing//Proceedings SPIE. Vol. 3550. Pp. 60-64. 1998.), which consists in successive application a layers of various powders and selective sintering thereof.

However this method gives no way of producing the sintered area from different powders lying in the same plane.

The most closely approach in technical essence is the method for producing objects with gradient of properties (see I. Yadroitcev, Ph. Bernard, B. Laget, I. Smurov. Application of Laser Assisted Technology for Fabrication of Functionally Graded Coatings and Objects for ITER Components//Journal of Nuclear Materials. V.362. 2-3. P. 189-196. 2006.), which consists in successive application a layers of various powders and selective sintering thereof.

However this method gives no way of producing the sintered area from different powders lying in the same plane.

Device for selective laser sintering of the 3D object from powders is known [3] which consist of processing chamber, laser optically connected with focusing and scanning systems, build chamber with piston be displaced powder layer with object to be sintered, feeding container and re-coater powder feeding systems with roller.

With the use of this device the sintered areas on different powders, lying in the same plane will not produced.

The most closely approach in technical essence is device for selective laser sintering of the 3D object from powders (see S. Baev, V. Bessemeltsev, V. Krilov et al. Development of prototype of the build station for 3D models production by method of laser sintering or ablation//Optical Technics, No 1, p. 15-17, 2002.) which consist of processing chamber laser optically connected with focussing and scanning systems, build chamber with piston be displaced powder layer with object to be sintered, feeding container and re-coater powder feeding systems, system removing the unsintered powder.

This device is not appropriate for selective sintering areas from different powders, lying in the same plane-in layer 20-100 thickness, because using sucktion or blow away it is not possible to remove unsintered powder from the so much thick layer, as is inferred from (see Meiners W. Lassen A., Wissenbach K.//Patent U.S. Pat. No. 6,861,613, Jan. 3, 2005).

SUMMARY OF THE INVENTION

The aim of the claimed invention is to develop a method for producing three-dimensional objects from powders and a device for implementing said method, thereby making it possible to obtain three-dimensional objects, having a gradient of properties and multi-material objects.

A method involves the selection of powders of various materials according the diameter, the successive application of layers of powder of a given thickness during the vertical displacement of a piston of a build chamber with an object to be sintered, and the programmed selective sintering/melting of a given area in the plane of each layer.

After sintering, piston is raised through the height of layer unsintering powder is removed from a layer. The piston is then returned and a layer of powder having a different diameter and being of a different material is applied and selectively sintering/melting. The process is repeated the requisite number of times, depending on a number of materials applied in layer, producing sintered areas from powders of different materials in a single layer.

When the object sintering process is finished, the unsintered powder is removed from the build chamber, and the powders are separated according to diameter, thus separating the powders of different materials.

The separated powders are returned to feed containers and are re-used.

Device for implementing the method contains processing chamber with window, laser with scanner, build chamber with piston, powder feeding container, re-coater powder feeding system.

Device is supplemented by N re-coater powder feeding systems combine with the formation of the unitary re-coater powder feeding module.

Device is supplemented by N powder feeding containers and surface cleaning system built with a possibility to move in the direction of the re-coater powder feeding module movement.

In addition the device is supplemented by the system removing the unsintered powders, system for powders separation by sieving and system for powders supply to a powder feeding containers for re-used.

DETAILED DESCRIPTION OF THE INVENTION

The aim of the claimed invention is to develop a method for producing three-dimensional objects from powders, having a gradient of properties and multi-material objects, which will favorable to producing the sintered areas from different powders, lying in the same plane.

A given task can be solved by new advanced method for producing objects with gradient of properties and multi-material objects. A method involves the selection of powders of various materials according the diameter, the successive application of layers of powder of a given thickness during the vertical displacement of a piston of a build chamber with an object to be sintered, and the programmed selective sintering/melting of a given area in the plane of each layer.

In so doing the thickness of the layer must be multiple of the maximum diameters of the particles in the composition of the layer.

Figure 1:
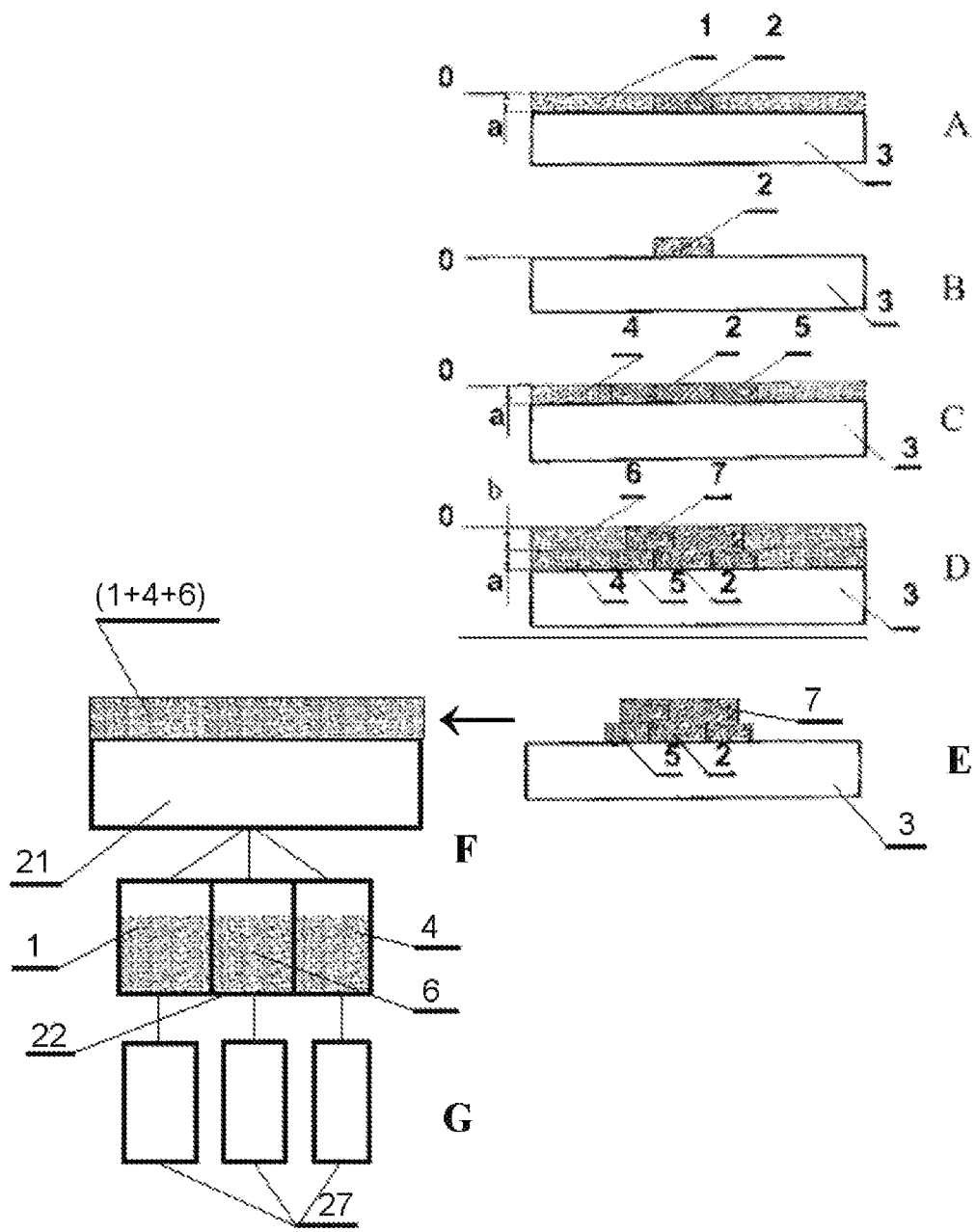
FIG. 1. Is the scheme of a stages of three-dimensional objects sintering.

The essence of the method is explained in FIG. 1.

The layer of a thickness a of a powder 1 with a fixed particle diameter is applied on a piston 3 of the build chamber (FIG. 1A). After selective sintering of the area 2 piston 3 with sintered object 2 is raised through the height of layer a. The unsintered powder 1 is removed (FIG. 1B).

The piston is then returned and a layer of a thickness a of a powder 4 having a different diameter and being of a different material is applied and area 5 of the powder 4 is selectively sintered/melted (FIG. 1C).

The process is repeated number of times, depending of the number of dissimilar powders (materials) in a given layer, causing the sintered area 2,5 from dissimilar powders (materials) in the same layer.

The completion of the sintering of the given layer the piston 3 is lowered at a thickness b of the next layer (FIG. 1D). The operations 0023-0025 are repeated in this layer, for example, sintering of area 7 in powder 6 is followed.

When the object sintering process is finished, the unsintered powder is removed from the build chamber (FIG. 1E), and the powders are sieved at system 21 and separated according to diameter (FIG. 1F), thus separating the powders, of different materials. The separated powders are returned to feed containers 27 (FIG. 1G) for re-used.

A device for implementing said method has been proposed, that extends the functional capabilities of a devices for production 3D objects with gradient of the properties.

Device for implementing the method contains processing chamber with window, laser optically connected with focussing and scanning systems, build chamber with piston, several powder feeding containers, several re-coater powder feeding systems combine with the formation of the unitary re-coater powder feeding module and surface cleaning system built with a possibility to move in the direction of the re-coater powder feeding module movement.

The essence of the claimed device is explained in the drawing (FIG. 2), where 8 is a laser, 9—laser scanner with lens, 0—build platform, 1—powder layer, 2-3D object, 12—processing chamber, 13—surface cleaning system, 14—shut off valve, 10—window, 20—build chamber, 15—gas system, 16—vacuum system, 17—container for unsintered powder, 18—openings for removing the unsintered powder, 19—motor of vertical transport, 21—system for powder separation by sieving, 22—containers of separated powders, 23—container for defective powder, 24—vacuum transport system 25 blade, 26—re-coater powder feeding module, 27—powder feeding container, 28—shut off distributer, 29-roller.

The device operates as follows. Processing chamber is pumped for a vacuum using vacuum system 16 and is filled with a neutral gas from gas system 15. Re-coater powder feeding module 26 is filled with powders from feed containers 27. The layer of powder 1 (FIG. 1) is applied on the piston 3 of the build chamber 20 and area 2 (FIG. 1) is sintered.

Before the application of other powder to this layer the piston 3 is raised through the height of layer using stepper motor 19, unsintered powder 1 is removed from a layer using surface cleaning system 13 with special roller or blade that is moving parallelly to the movement of the re-coater module 26. The unsintered powder is dumped to container 17 through valve 14.

The piston 3 is then returned and a layer of a powder 4 having a different diameter and being of a different material is applied and area 5 of the powder 4 is selectively sintered/melted (FIG. 1). The process is repeated for the other powders from the composition of the given layer.

The laying of the powder is carried out by measured dumping of the powder from the re-coater module 26 on the build platform and leveling with blade 25. Powder layer is compacted with roller 29 while the re-coater module is running back.

The completion of the sintering of the given layer the piston 3 is lowered at a thickness b of the next layer (FIG. 1D). The operations 0031-0033 are repeated in this layer, for example, sintering of area 7 in powder 6 is followed.

While 3D object sintering completed, the piston 3 is lowered down up to the stop. Unsintered powders are removed to container 17 through holes 18 with gas system 15. Furthermore, unsintered powders are conveyed from containers 17 to systems for powders separation by sieving 21.

Powders are separated accordingly a particle diameters and in so doing a powders of dissimilar materials are separated. Separated powders are vacuum conveyed from containers 22 to powder feeding containers 27 through shut off distributer 28 for re-use.

From time to time ups and downs of piston at different height and depth with according to layer composition and a particle diameters make it possible to obtain the sintered areas from dissimilar powders (materials) in the same layer, to obtain the three-dimensional interface between dissimilar materials and, by this means, to produce 3D object with gradient of properties and 3D multi-material object.

The implementation of difference in particles diameters of a dissimilar materials for their separation makes possible their re-use with high (up to 100%) efficiency.

An example of the implementation of the proposed method is given.

Example Below is Given to Illustrate the Spirit of the Instant Invention

Consider the stage of separation powders of different materials in the process of producing a three-dimensional object from two powders of different diameters from two materials. In step a) of the patentable application method, we select the powder 1 of material 1 with a particle diameter of 1 and the powder of material with a particle diameter of 4. The powders are filled up into two feeding containers 27 (FIG. 1), separate for each material. We carry out the sintering process according to step b-i.

Figure 2:
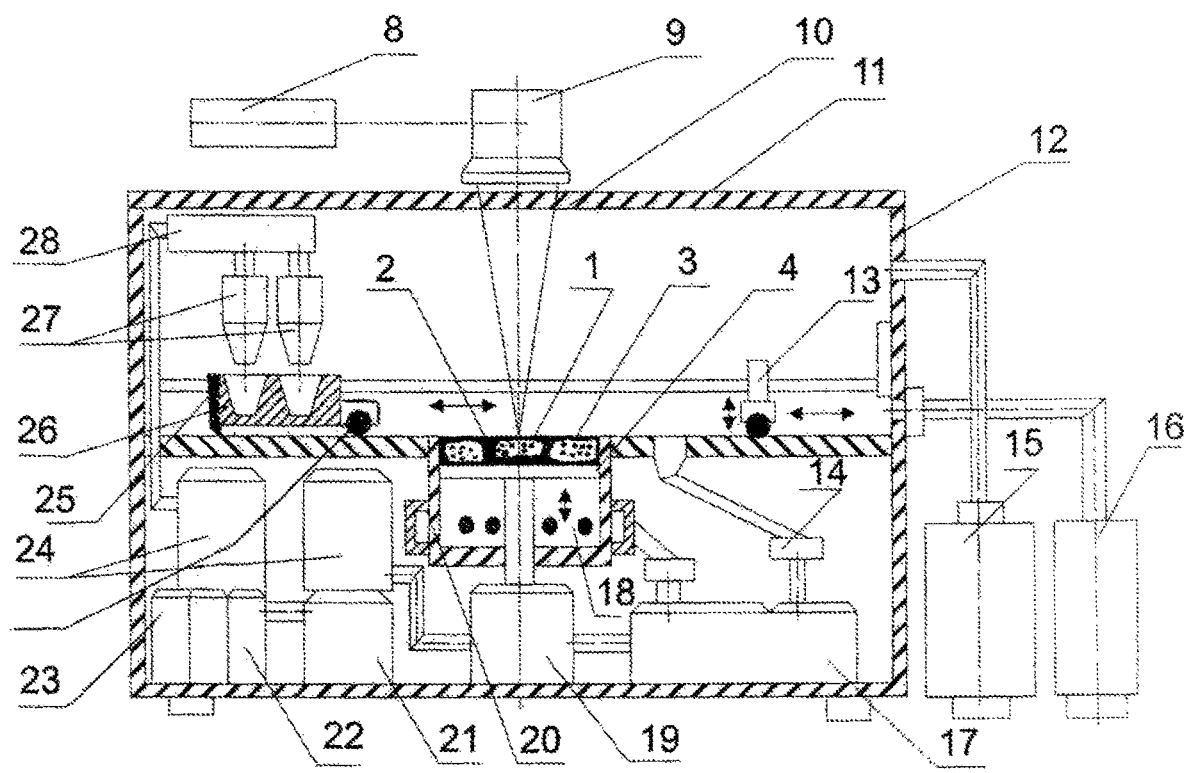
FIG. 2 is the scheme of the device for implementing the method.

At stage j), all unsintered powder are conveyed from container for unsintered powder 17 to sieving station, pos. 21 in FIG. 2.

Figure 3:
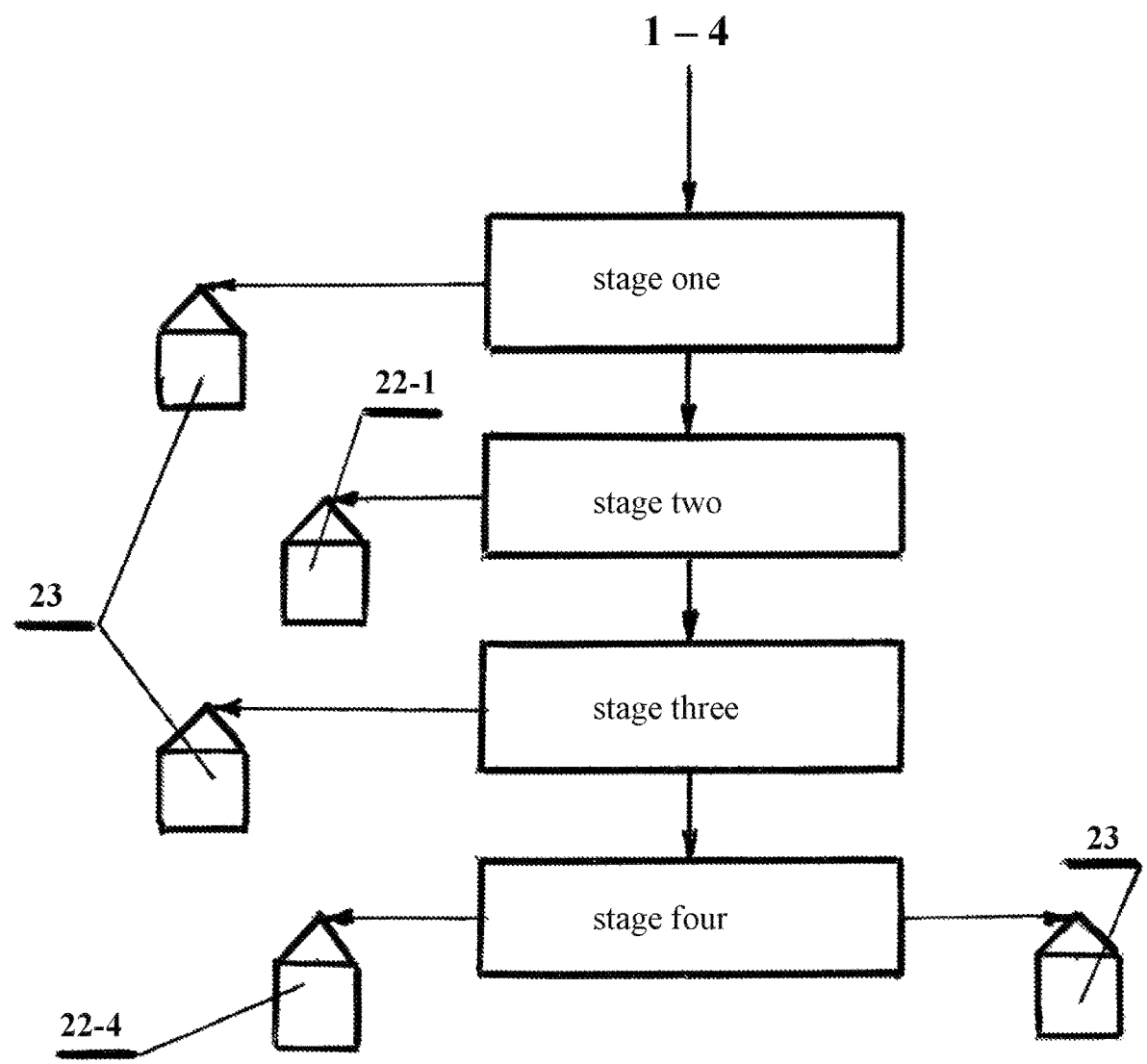

This sieving station contains a specially selected set of sieves to screen a given set of powders. The sifting process occurs in four stages. The scheme is shown in FIG. 3.

The unsintered powder 1 and unsintered powder 4 enters a first stage and the defective powder with a size larger than a maximum diameter of powders 1 and 4 is screened out to container 23 for defective powder, and the powder with smaller size passes to the second stage where the powder with larger diameter 1 is screened out and is conveyed to a separate container 22-1 for material 1.

The rest of the powder passes to stage three. The defective powder with a diameter of more than diameter 4 of powder 4 is separated and conveyed to container for defective powder 23. The rest of powder passes to the stage four and the powder 4 of material 4 is separated and conveyed to defective powder container 23. Thus, at stage j) of the process, powders of various diameters of various materials are completely separated with 100% efficiency and defective powder is separated regardless of their nature—metal, plastic, ceramic.

This is not achieved in any of the opposed methods and devices.

From individual containers 22 for each material, powders 1 and 4 are conveyed by means of a vacuum transport system 24 to feed containers 27, for reuse.

Such separation system is designed, produced and tested.

What is claimed is:

1. A method for producing a three-dimensional object from powders, the objects having a gradient of properties, comprising:
   a successive application of layers of powders of dissimilar materials during a vertical displacement of a piston of a build chamber with the object to be sintered and a programmed selective sintering/melting of a given area in a plane of each layer, wherein:
   a) selected powders of dissimilar materials with strictly defined different diameters of particles are filled up to powder feeding containers, individual for each diameter and material, respectively;
   b) a first powder layer with a first thickness being multiple of a maximum particle diameter from a material of the first layer is applied;
   c) the sintering/melting of the given area in a plane of a first layer is carried out;
   d) the piston of the build chamber is raised above a height of the first layer;
   e) the unsintered powder is removed from the first layer into a container for unsintered powder;
   f) the piston of the build chamber is lowered at the height of the layer;
   g) a powder of another material is applied and stages c-f are repeated a necessary number of times according to a desired powder composition;
   h) the piston of the build chamber is lowered at a height of a next layer with a second thickness being multiple of a maximum particle diameter from a material of this layer and stages b-g are repeated a necessary number of times for 3D object sintering;
   i) the piston of the build chamber is lowered down, and all unsintered powders are removed through holes in the build chamber via a gas system into the container for unsintered powder;
   j) all unsintered powders are conveyed from the container for unsintered powders to a sieving station via a vacuum transport system and are sieved and separated simultaneously accordingly by a diameter of the particles and in so doing powders of dissimilar materials are separated; defective powder is separated at the same time;
   k) all sieved powders are dumped into powder containers, individual for each diameter and material, respectively; and,
   l) all sieved powders are conveyed by the vacuum transport system from their containers into powder feeding containers, individual for each diameter and material, respectively, for re-use.

2. The method according to claim 1, wherein the selective sintering/melting is carried out by a laser radiation.

3. The method according to claim 1, wherein the selective sintering/melting is carried out by an electron beam.

* * * * *